US012669312B2

(12) United States Patent
Tunis, III et al.

(10) Patent No.: US 12,669,312 B2
(45) Date of Patent: Jun. 30, 2026

(54) SOFT ARMOR EDGE ENHANCEMENT

(71) Applicant: Hardwire, LLC, Pocomoke City, MD (US)

(72) Inventors: George C. Tunis, III, Ocean City, MD (US); Benjamin John Kremer, Snow Hill, MD (US)

( * ) Notice: Subject to any disclaimer, the term of this patent is extended or adjusted under 35 U.S.C. 154(b) by 119 days.

(21) Appl. No.: 18/528,309

(22) Filed: Dec. 4, 2023

(65) Prior Publication Data

US 2024/0183639 A1      Jun. 6, 2024

Related U.S. Application Data

(60) Provisional application No. 63/429,806, filed on Dec. 2, 2022.

(51) Int. Cl.
| | |
|---|---|
| *F41H 5/04* | (2006.01) |
| *B32B 3/26* | (2006.01) |
| *B32B 5/02* | (2006.01) |
| *B32B 37/18* | (2006.01) |
| *B32B 38/04* | (2006.01) |
| *F41H 5/013* | (2006.01) |

(52) U.S. Cl.
CPC ........... *F41H 5/0471* (2013.01); *B32B 3/266* (2013.01); *B32B 5/02* (2013.01); *B32B 37/18* (2013.01); *B32B 38/04* (2013.01); *F41H 5/013* (2013.01); *B32B 2038/045* (2013.01); *B32B 2260/021* (2013.01); *B32B 2260/048* (2013.01); *B32B 2571/02* (2013.01)

(58) Field of Classification Search
CPC ..... F41H 1/00; F41H 1/02; F41H 5/06; F41H 5/0471; F41H 5/0485
See application file for complete search history.

(56) References Cited

U.S. PATENT DOCUMENTS

| | | | |
|---|---|---|---|
| 2014/0311327 A1* | 10/2014 | Dunleavy | F41H 5/0478 |
| | | | 264/258 |
| 2016/0209178 A1* | 7/2016 | Bailey | F41H 5/0414 |
| 2016/0298937 A1* | 10/2016 | Woodall | F41H 5/0478 |
| 2020/0025526 A1* | 1/2020 | Seuk | F41H 5/02 |
| 2020/0300582 A1* | 9/2020 | Becker | A41D 13/0012 |

* cited by examiner

*Primary Examiner* — J. Woodrow Eldred
(74) *Attorney, Agent, or Firm* — Verrill Dana, LLP; Robert L. Hover

(57)      ABSTRACT

Provided herein are ballistic armor articles including a first layer of ballistic material modified to permit a projectile to pass therethrough, a second layer of ballistic material for inhibiting the projectile from passing therethrough, and a connecting portion of ballistic material for preventing the projectile from passing therethrough, the connecting portion extending between the first and second layers, wherein, the connecting portion is positioned to inhibit the projectile from exiting the ballistic armor article due to ricocheting or spinning caused by impact between the projectile and the second layer.

19 Claims, 18 Drawing Sheets

100

3) The projectile is stopped and trapped in the top pocket.

2) Projectile tends to skip or ricochet off the non-slit layers.

1) Projectile enters through the slits.

Base armor

Enlarged view

100

105

107

103

Roll-folding the sheet sequentially

100

Side view (magnified) showing continuity of the sheet around the fold lines.

3) The projectile is stopped and trapped in the top pocket.

2) Projectile tends to skip or ricochet off the non-slit layers.

1) Projectile enters through the slits.

100

Enlarged view

Armor surface normal

45°

100

Threat trajectory

Base armor

Baseline Test

900

SOFT ARMOR EDGE ENHANCEMENT

CROSS REFERENCE TO RELATED APPLICATIONS

This application claims benefit under 35 U.S.C. § 119(e) of U.S. Provisional Application No. 63/429,806, filed on 2 Dec. 2022, entitled "SOFT ARMOR EDGE ENHANCE-MENT," the entirety of which is incorporated by reference herein.

BACKGROUND

Soft personal body armor is often constructed of layers of ballistic resistant material (e.g., Kevlar, Dyneema, etc.) made into, for example, a vest configuration. It may also include one or more rigid inserts positioned to provide additional protection for the wearer. However, typical soft body armor (and all other ballistic armor articles for that matter) loses stopping power against ballistic threats near any edge of the article. This is a known and expected issue to the extent that the edge performance is often specified along with the ballistic threat level. For example, the National Institute of Justice (NIJ) Standard-0101.6 (National Institute of Justice Standard-0101.06 "Ballistic Resistance of Body Armor NIJ Standard-0101.06", July 2008.) specifies a minimum "Shot-to-Edge" distance in section 7.6.1 that requires the certified threat level must be met for all positions 51 mm (2.0 inches) or more from any armor edge.

Another well-known problem is that a non-zero "Angle of Incidence" (AOI) can also decrease the effectiveness of the armor. Zero degrees (0°) angle of incidence is where the threat trajectory is perpendicular to the surface of the armor (i.e., parallel to the surface normal of the armor). For example, Section 7.8.5 of NIJ-0101.6 requires 2 shots at angles greater than 0°, one at 30° and one at 45°, at a location significantly away from any edge. However, the limit requirements of "Shot-to-Edge" distance and "Angle-of-Incidence" are NOT required simultaneously by NIJ-0101.06. This leaves vulnerabilities open near the edges of the armor, which are exacerbated by any combination with non-zero AOI.

In order to illustrate the deficiencies of soft body armor in the context of an edge shot at a non-zero angle of incidence, two particularly vulnerable situations are illustrated in FIGS. 1A and 1B. FIG. 1A generally illustrates a test setup similar to an NIJ-0101.06 test setup with the exception that AOI is 45° upward (relative to the armor outward normal), and 1.0 inches from the neckline. FIG. 1B generally illustrates a test setup similar to an NIJ-0101.06 test setup with the exception that the armor is angled at 45° to an oncoming shot having a flat trajectory, thus also creating the 45° upward AOI relative to an outward axis normal to the armor, also 1.0 inches from the neckline. More generally, the 45° AOI (or any other AOI) can result due to 1) a shot from 45° below on a vertical panel, 2) a direct horizontal shot at an armor panel tilted to 45° back from vertical, or 3) a combination of 1 & 2.

Such situations where a "Shot-to-Edge" is complicated by an "Angle-of-Incidence" are challenging in that they typically result in the projectile ricocheting off the armor and into the wearer (e.g., into the wearer's neck). In addition, particularly in multi-combatant or bystander scenarios, the ricocheting projectile can also present a threat to others in addition to the armor-wearer.

SUMMARY

Provided herein are soft armor edge enhancements for body armor that can help contain threats along an edge of the body armor (e.g., near the neckline). Particularly in situations where a "Shot-to-Edge" is complicated by an "Angle-of-Incidence." As noted above, such situations are challenging in that they typically result in the projectile ricocheting off the armor and into the wearers neck. The application of the invention is far reaching in that it can be applied to other vulnerable areas around the armor, and to multi-participant combat situations where a ricochet bullet presents a threat to others in addition to the armor-wearer.

In particular, such soft armor edge enhancement provides enhanced ballistic resistance from a plurality of angles of impact at the regions near the perimeter of the armor by providing at least one first layer configured to permit a projectile to pass therethrough (also referred to herein as a "compromised" or "modified" layer) and at least one second layer configured to prevent the projectile from passing therethrough (also referred to herein as an "unmodified" layer), and a connector configured to retain the projectile between the first and second layers.

Such layering advantageously leaves the outer layer or layers of the SDAP vulnerable enough that threats can enter the SDAP to avoid ricocheting, while the inner layer or layers remain strong enough to stop the bullet from spinning and advancing forward once contained inside. Thus, the soft armor edge enhancements provided herein reduce impact trauma and spalling from projectiles.

In one aspect, a ballistic armor article is provided. The ballistic armor article includes a first layer of ballistic material modified to permit a projectile to pass therethrough. The ballistic armor article also includes a second layer of ballistic material for inhibiting the projectile from passing therethrough. The ballistic armor article also includes a connecting portion of ballistic material for preventing the projectile from passing therethrough, the connecting portion extending between the first and second layers. The connecting portion is positioned to inhibit the projectile from exiting the ballistic armor article due to ricocheting or spinning caused by impact between the projectile and the second layer.

In some embodiments, the first layer is modified by forming one or more apertures therein. In some embodiments, the apertures are slits sized to permit entry of one or more projectiles into the ballistic armor article. In some embodiments, the slits are about 2 inches long and spaced about 0.5 inches apart. In some embodiments, the first layer and the second layer are formed in segments along a single continuous sheet of ballistic material, the first and second layers alternating longitudinally along the single sheet of ballistic material. In some embodiments, the single continuous sheet of ballistic material is roll-folded to form the first and second layers such that the second layer is positioned closer to a wearer of the ballistic armor article than the first layer. In some embodiments, the connecting portion includes a fold line in the single continuous sheet of ballistic material between the first layer and the second layer. In some embodiments, the ballistic armor article also includes a plurality of first layers and a plurality of second layers formed in segments along the single continuous sheet of ballistic material, the first and second layers alternating longitudinally along the single continuous sheet of ballistic material. In some embodiments, the single sheet of ballistic material is roll-folded to form the first and second layers such that at least one of the second layers is positioned closer to a wearer of the ballistic armor article than at least one of the first layers. In some embodiments, each of the second layers is positioned closer to the wearer of the ballistic armor article than any of the first layers. In some embodiments, each of the first layers is modified by forming one or more apertures therein sized to permit entry of one or more projectiles into the ballistic armor article.

In some embodiments, the apertures formed in each of the first layers are offset such that the apertures in adjacent first layers are misaligned. In some embodiments, the first layer and the second layer are formed from separate sheets of ballistic material. In some embodiments, the connection is glued, stitched, or both. In some embodiments, the ballistic material includes at least one of ultra-high molecular weight polyethylene fibers in a urethane matrix or binder, aramid fibers, polybenzoxazole, fiberglass, steel, or combinations thereof. In some embodiments, the ballistic armor article is configured for attachment along an edge of a body armor element. In some embodiments, the ballistic armor article is one or more of adhered by an adhesive, stitched, or both to the body armor element. In some embodiments, the ballistic armor article also includes a ballistically fragile cover adhered to the ballistic armor article opposite the body armor element. In some embodiments, the ballistically frag- ile cover is sized to extend over the ballistic armor article and beyond a perimeter of the ballistic armor article. In some embodiments, portions of the ballistically fragile cover extending beyond the perimeter are configured to be adhered by an adhesive, stitched, or both to the body armor element to reduce a risk of separation of the ballistic armor article from the body armor element during a ballistic event. In some embodiments, the body armor element is an armor vest or jacket and the edge is a neckline of the armor vest or jacket.

In another aspect, a ballistic armor device is provided. The ballistic armor device includes an armor vest or jacket. The armor vest or jacket includes a ballistic armor article inte- grally formed along a neckline thereof. The ballistic armor article includes a first layer of ballistic material modified to permit a projectile to pass therethrough. The ballistic armor article also includes a second layer of ballistic material for inhibiting the projectile from passing therethrough. The ballistic armor article also includes a connecting portion of ballistic material for preventing the projectile from passing therethrough, the connecting portion extending between the first and second layers. The connecting portion is positioned to inhibit the projectile from exiting the ballistic armor article due to ricocheting or spinning caused by impact between the projectile and the second layer.

In still another aspect, a method for making a ballistic armor article is provided. The method includes providing a single sheet of ballistic material for inhibiting a projectile from passing therethrough. The method also includes modi- fying at least one segment of the single sheet of ballistic material to permit the projectile to pass therethrough. The method also includes not modifying at least one segment of the single sheet of ballistic material to permit the unmodified segment to inhibit the projectile from passing therethrough. The method also includes roll-folding the single sheet of ballistic material to form a ballistic armor article having at least one first layer comprising the at least one modified segment and at least one second layer comprising the at least one unmodified segment. The connecting portions of the roll-folded ballistic armor article extending between the first layer and the second layer at each fold of the roll-folded ballistic armor article are unmodified to inhibit the projectile from passing therethrough and are positioned to inhibit the projectile from exiting the ballistic armor article due to ricocheting or spinning caused by impact between the pro- jectile and the second layer.

DETAILED DESCRIPTION

Provided herein are soft armor edge enhancements for body armor that can help contain threats along an edge of the body armor (e.g., near the neckline). Particularly in situa- tions where a "Shot-to-Edge" is complicated by an "Angle- of-Incidence." As noted above, such situations are challeng- ing in that they typically result in the projectile ricocheting off the armor and into the wearers neck. The application of the invention is far reaching in that it can be applied to other vulnerable areas around the armor, and to multi-participant combat situations where a ricochet bullet presents a threat to others in addition to the armor-wearer.

Although the drawings and description provided below generally focus on embodiments configured to be an installable "add-on" soft armor edge enhancement (also referred to as a "specially designed armor package" or "SDAP") used to retrofit an existing body armor or element thereof, in some embodiments, the soft armor edge enhancements provided herein can instead be integrally formed during manufacture as part of any body armor or element thereof. In both instances, the soft armor edge enhancement provides enhanced ballistic resistance from a plurality of angles of impact at the regions near the perimeter of the armor.

In addition, although shown and described herein as having a six-layer construction, the soft armor edge enhancements provided herein can include any ballistic armor article having a first layer configured to permit a projectile to pass therethrough (also referred to herein as a "compromised" or "modified" layer), a second layer configured to prevent the projectile from passing therethrough (also referred to herein as an "unmodified" layer), and a connector configured to retain the projectile between the first and second layers.

Such layering advantageously leaves the outer layer or layers of the SDAP vulnerable enough that threats can enter the SDAP to avoid ricocheting, while the inner layer or layers remain strong enough to stop the bullet from spinning and advancing forward once contained inside. Thus, the soft armor edge enhancements provided herein reduce impact trauma and spalling from projectiles.

Figures 1A, 1B:
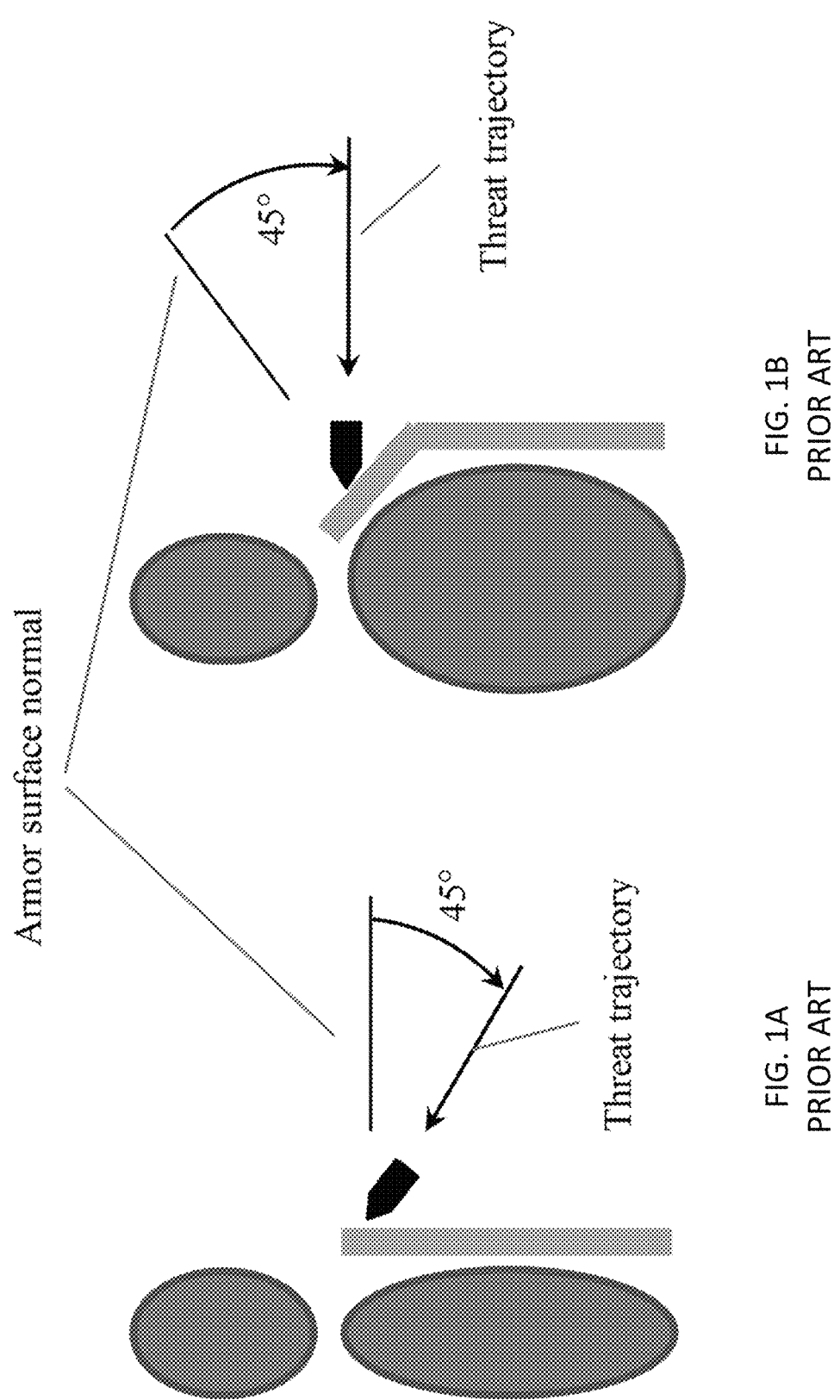
FIG. 1A illustrates a modified NIJ-0101.06 test setup for an unmodified armor element wherein an angle of incidence (AOI) is 45° upward (relative to an outward normal axis of the armor element), and the test shot makes impact one (1) inch from a neckline of the body armor element in accor- dance with the prior art.
FIG. 1B illustrates a modified NIJ-0101.06 test setup for an unmodified armor element wherein the armor element is angled at 45° relative to an oncoming test shot having a flat trajectory, thus creating a 45° upward AOI relative to an outward normal axis of the armor, and the test shot makes impact one (1) inch from the neckline in accordance with the prior art.
Figure 2:
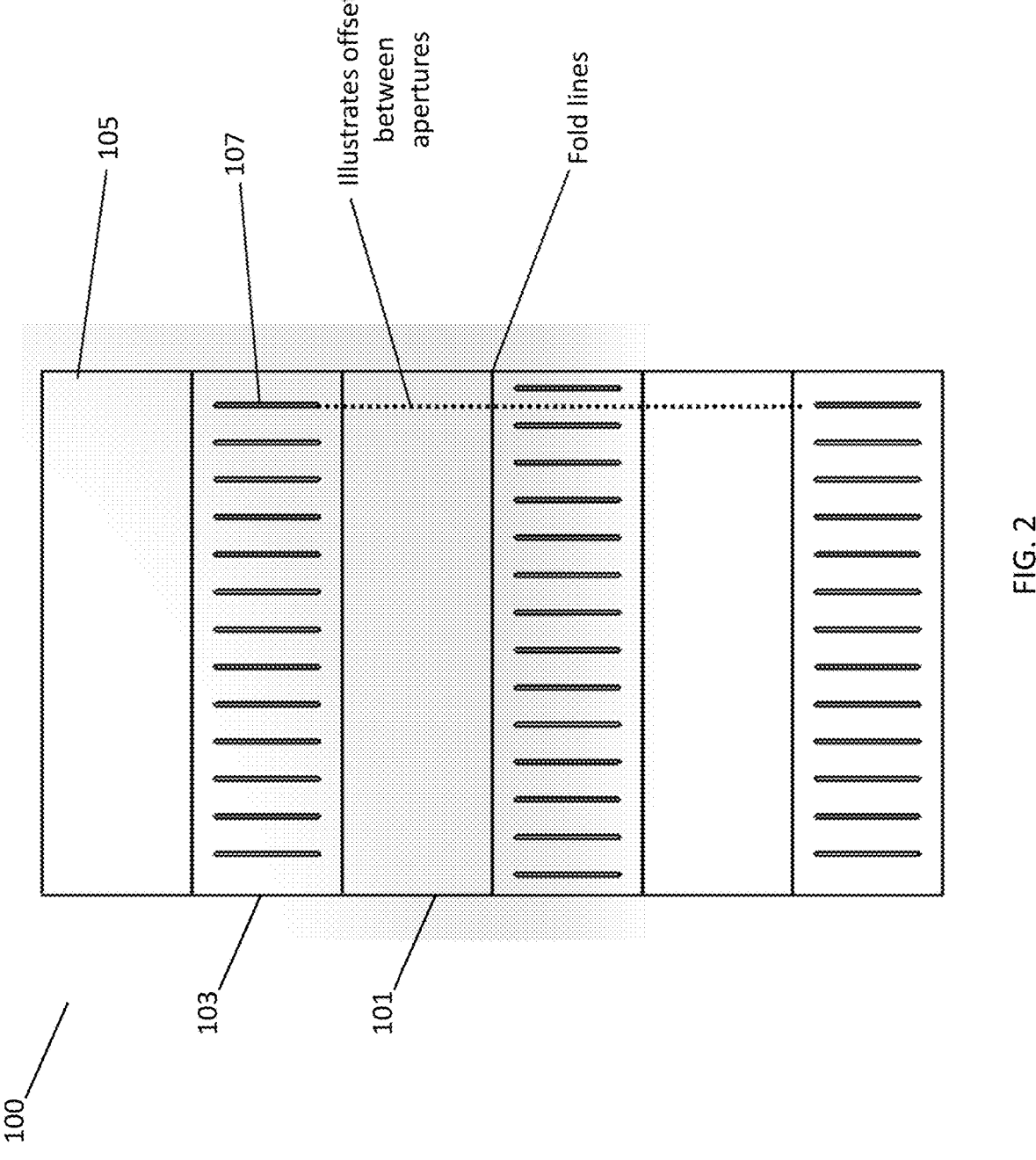
FIG. 2 illustrates a roll-foldable ballistic material sheet having alternating segments of compromised (e.g., slitted as shown) and uncompromised material in accordance with various embodiments.

Referring now to FIGS. 2-4, 5A-5B, and 6A-6B, in some embodiments, a SDAP ballistic armor article 100 is provided for installation near an edge of an existing body armor, body armor insert 500 (e.g., the neckline of a vest insert as shown and described herein), any other body armor element, or combinations thereof (hereinafter collectively and interchangeably referred to as "body armor" or "body armor element"). As shown in FIG. 2, in some embodiments the SDAP 100 can include a single, continuous sheet of ballistic material 101 having one or more unmodified layers 105 configured to prevent the passing of a projectile therethrough and one or more modified layers 103 which are modified to be compromised so as to permit a projectile to pass therethrough. The ballistic material 101 can generally include any suitable ballistic resistant material including, for example, ultra-high molecular weight polyethylene fibers in a urethane matrix or binder, aramid fibers, polybenzoxazole, fiberglass, steel, or combinations thereof. For example, in some embodiments, the sheet 101 can be formed by assembling three (3) layers of Dyneema HB212 and consolidating them in a press to produce the sheet 101. Because each layer of Dyneema HB212 includes 4 layers of unidirectional Dyneema in a (0, 90, 0, 90) layup, the sheet 101 includes 12 layers of unidirectional Dyneema in such embodiments.

The compromised layers 103 can generally include one or more apertures 107 (e.g., slits as shown) formed therein and sized to permit a projectile to pass therethrough. The apertures 107 can be provided in any suitable size or arrangement for permitting projectile ingress. In some embodiments, as shown in FIG. 2, the apertures 107 of adjacent compromised layers 103 can preferably be offset or otherwise misaligned to form a more tortuous path for the projectile to reduce a velocity thereof as it passes into the SDAP 100. Furthermore, although the compromised layers are shown and described herein as including slits for permitting entry of the projectile, it will be apparent in view of this disclosure that any suitable size, shape, orientation, or configuration of slits or holes in the compromised layer can be used in accordance with various embodiments. Alternatively, or in addition, compromised layers 103 can be created by deliberate weakening of the soft armor of the compromised layer 103 and/or by partial replacement of the soft armor of the compromised layer 103 with a ballistically fragile non-armor textile.

Figure 3:
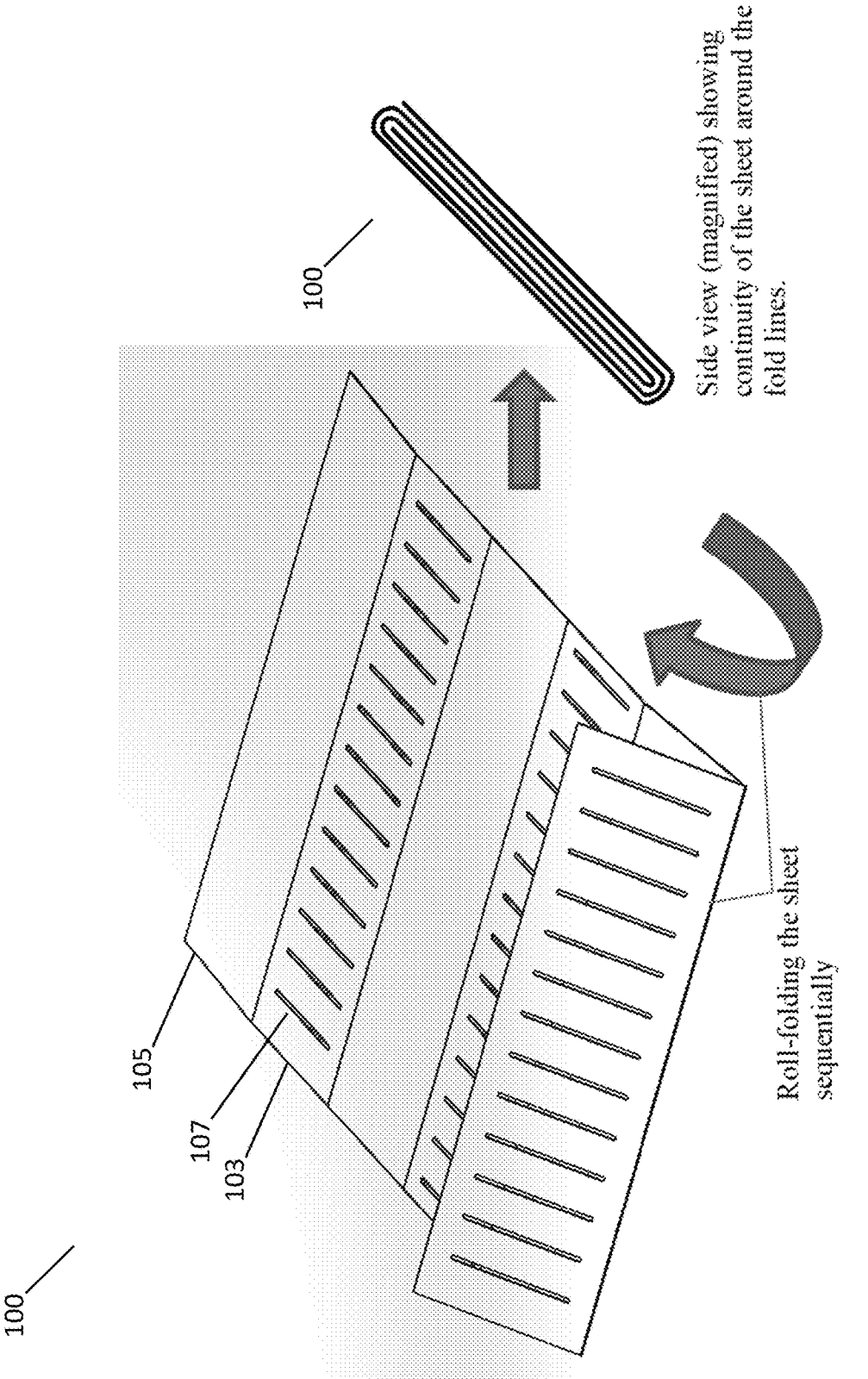
FIG. 3 illustrates a roll-folding technique for the sheet of ballistic material of FIG. 2.
Figure 4:
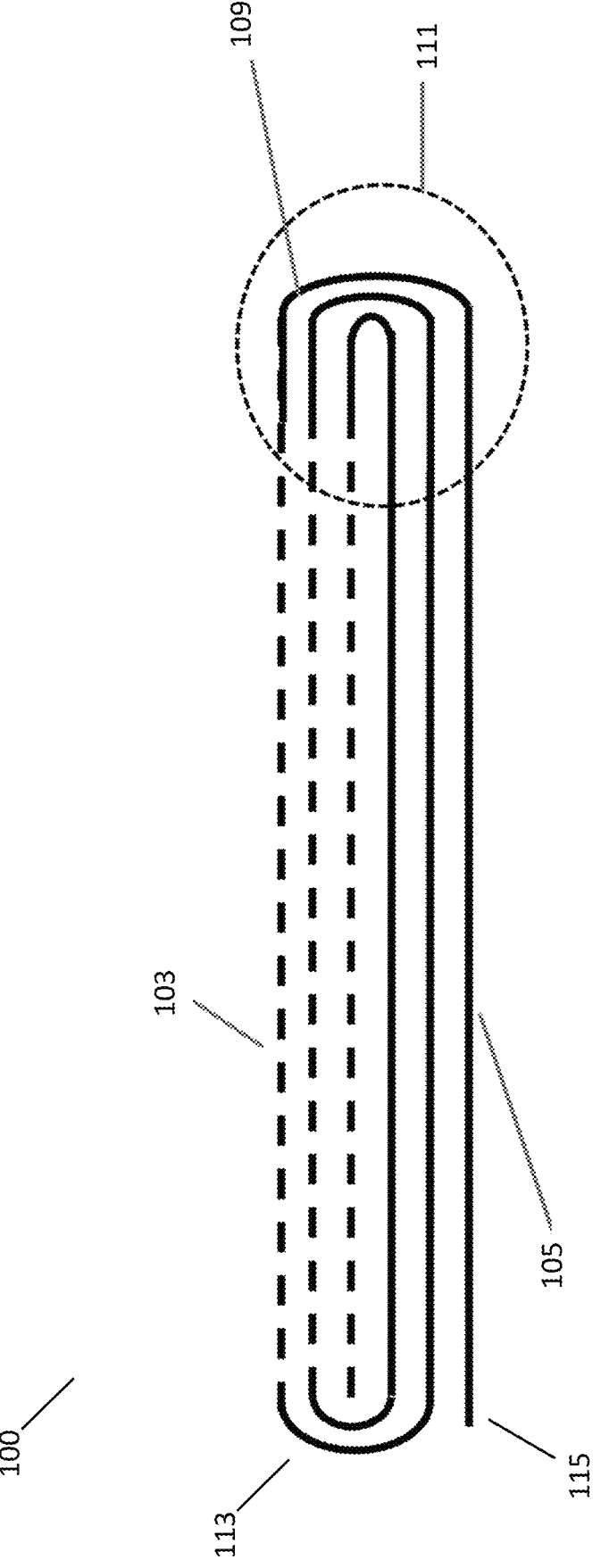
FIG. 4 illustrates a ballistic armor article comprising the sheet of ballistic material of FIG. 2 in a roll-folded state.

The SDAP 100 can be formed, as shown in FIG. 3, by roll-folding the sheet 101 such that, at least one of the unmodified layers 105 is closer to the body armor 500 (and thus the wearer) than at least one of the compromised layers 103. In some embodiments, as best shown in FIGS. 4 and 6A-6B, the sheet 101 can be roll-folded such that unmodified layers 105 are stacked together adjacent the body armor 500 and the compromised layers 103 are stacked together adjacent the stacked unmodified layers opposite the body armor 500 (and consequently a wearer/user of the body armor 500) to permit a projectile to enter therethrough. Although shown and described herein as having 6 layers of otherwise capable ballistic material (3 compromised layers and 3 unmodified layers), it will be apparent in view of this disclosure that ballistic armor articles as described herein can include any number of compromised and/or unmodified layers in accordance with various embodiments. In more detail, for example, in the specific embodiment shown in FIGS. 2-4, and 5A-5B, an 8"×12" sheet 101 is divided into 6 horizontal sections, each approximately 2" tall by 8" wide and assembled vertically as shown. The lines between the regions serve as fold lines during roll-folding, and the sheet is continuous across each fold line. A series of vertical slits 107 are cut into the bottom section. The slits 107 are about 0.050" wide each, by 1.4 inches tall, and are spaced every 0.5 inches across the section. This slit pattern is then repeated in the $3^{rd}$ and $5^{th}$ sections from the bottom, except that the $3^{rd}$ section is offset laterally by 0.25 inches from the slits in sections #1 & #5. The slits are centered vertically within a given section and are intentionally shorter than the height of their respective sections to provide sufficient uncompromised material to form connecting portions between the compromised layers 103 and the unmodified/uncompromised layers 105. It will be apparent however that sheets 101 of any size, divided into any number of sections, and having compromised layers 103 with any number, size, shape, and/or alignment of apertures 107 can be used in accordance with various embodiments.

As shown in FIGS. FIGS. 4 and 6A-6B, once the sheet 101 is roll-folded, the SDAP ballistic armor article 100 includes one or more connecting portions 109, each at least partially coincident with material forming a fold and extending between a compromised layer 103 and an unmodified layer 105. As shown, the connecting portions 109 include unmodified ballistic-resistant material of the sheet 101 so as to form a "pocket" or "pouch" for stopping motion and preventing egress of projectiles that enter the SDAP 100 via the compromised layers 103. As shown, the roll folded SDAP will include a first end 111 entirely comprised of layers of connecting portions 109 while a second end 113 will include a combination of connecting portions 109 and free ends 115 of the sheet 101. In some embodiments, the SDAP 100 can preferably be configured to be installed on the body armor 500 such that the first end 111 is aligned along the edge 501 (e.g., neckline) to be enhanced.

Although shown and described herein as being formed from a single, continuous, roll-folded sheet of ballistic material 101, SDAPs in accordance with various embodiments can instead be constructed from a plurality of separate layers. In such embodiments, the connecting portions can include seams between compromised layers and ballistic resistant layers which are adhered by an adhesive (e.g., glue, hot melt, and/or pressure sensitive adhesive), stitched, or both.

Figure 5B:
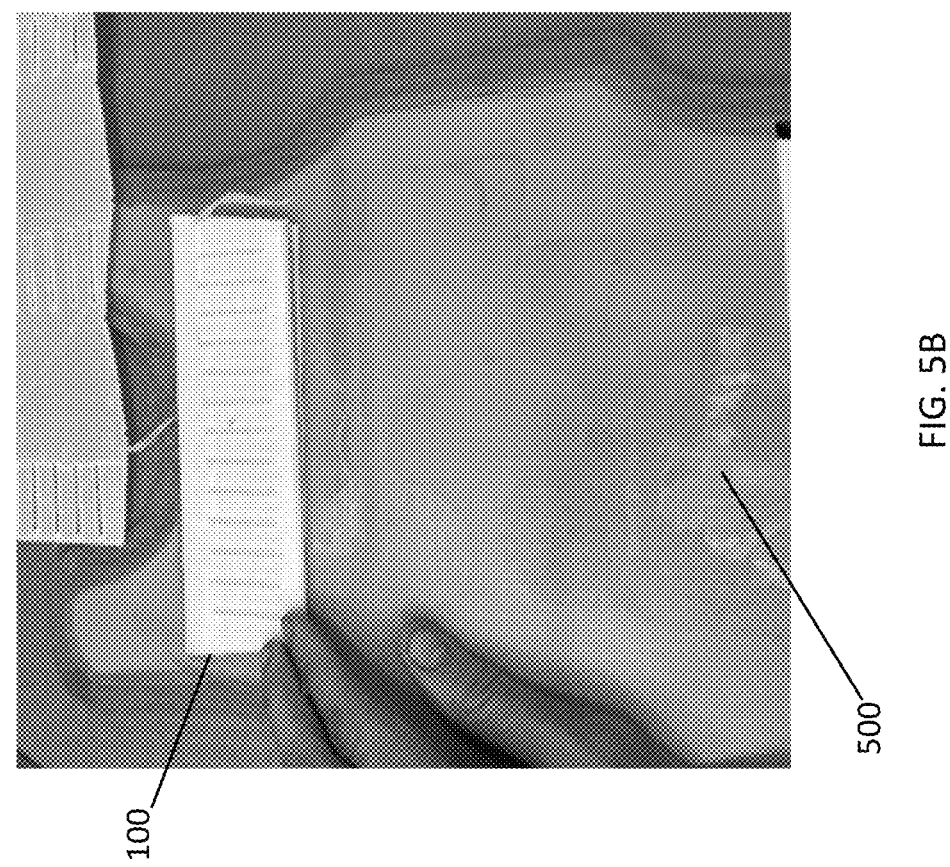
FIG. 5B illustrates placement of the ballistic armor article of FIG. 4 placed at a neckline of an armor element for adhesive bonding thereto to form an edge enhanced armor.
Figure 5A:
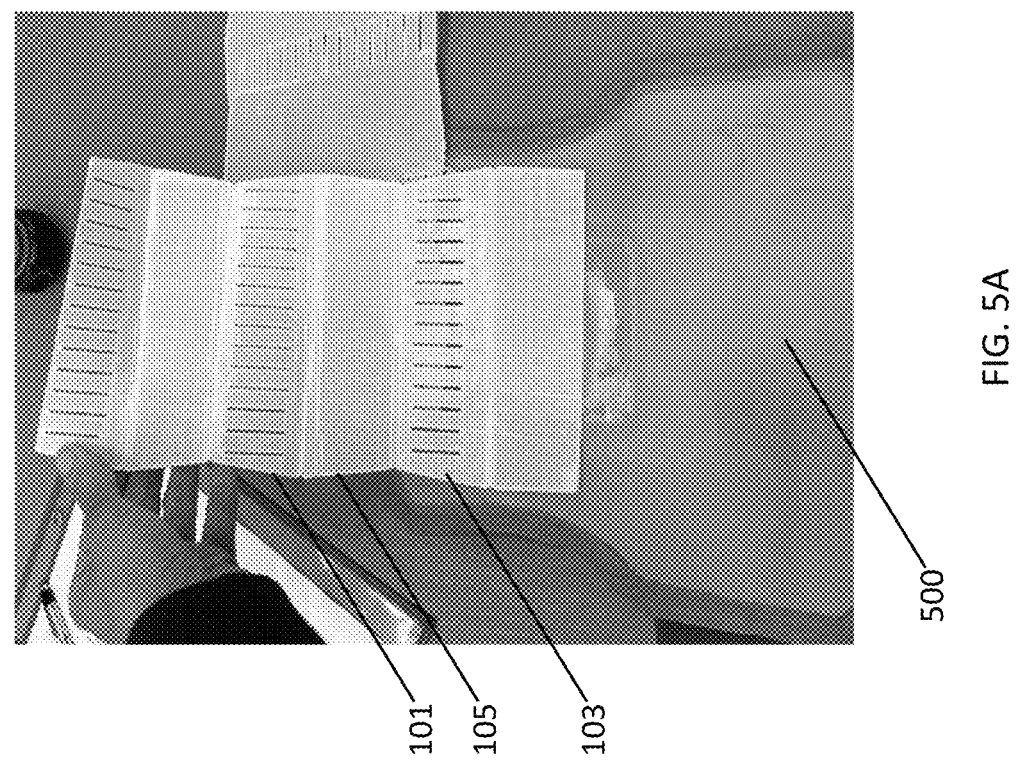
FIG. 5A illustrates the ballistic material sheet of FIG. 2 having fold lines for facilitating roll-folding.
Figures 6A, 6B:
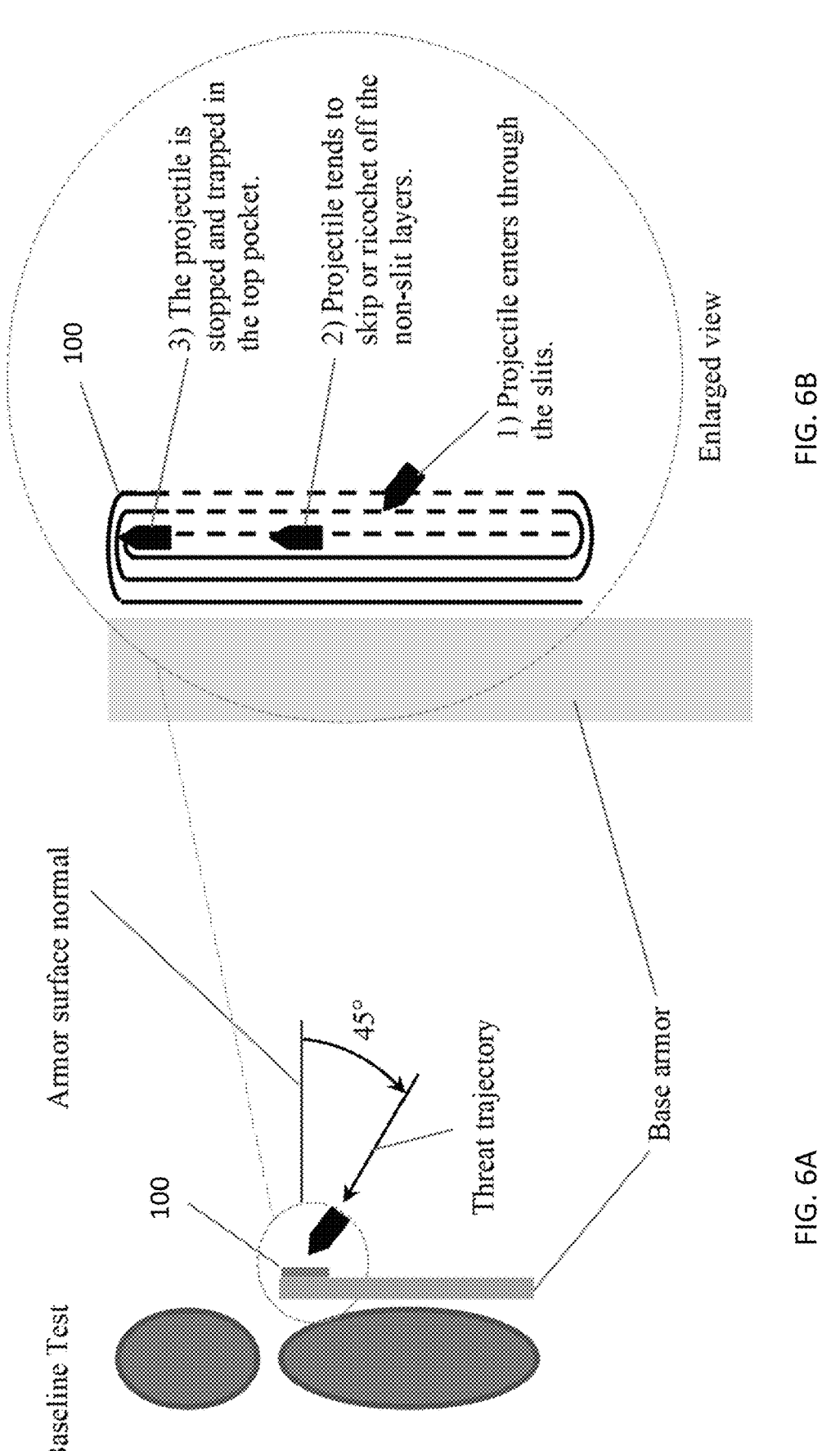
FIG. 6A illustrates a test of the edge enhanced armor of FIG. 5B using a modified NIJ-0101.06 test setup wherein an angle of incidence (AOI) is 45° upward (relative to an outward normal axis of the edge enhanced armor), and the test shot makes impact with the ballistic armor article of FIG. 4, one (1) inch from a neckline of the edge enhanced armor of FIG. 5B.
FIG. 6B illustrates ballistic resistant functionality of the ballistic armor article of FIG. 4 when subjected to the test of FIG. 5A.

As shown in FIGS. 5A and 5B, once the sheet 101 is roll-folded, the SDAP can be aligned with and attached to the edge 501 to be enhanced of the body armor 500 (e.g., the neckline as shown) to provide coverage across at least a portion of the edge of the armor article. For example, as specifically shown in FIGS. 5A-5B, the SDAP 100 can extend along the neckline of the body armor 500 and cover a region of the body armor 500 approximately 2.0 inches wide. However, in accordance with various embodiments, the SDAP 100 can have any width appropriate for an intended mission profile of the edge enhanced armor.

In use, as shown in FIGS. 6A-6B, a threat projectile having an upward AOI (e.g., 450 as shown) can enter the outward facing compromised layers 103 of the SDAP 100 but is then deflected, by the unmodified, ballistic resistant layers 105, and guided upward into a pocket formed by the connecting portions 109 along the enhanced edge 501 of the body armor 500.

FURTHER ENHANCEMENTS AND EMBODIMENTS

Figure 7:
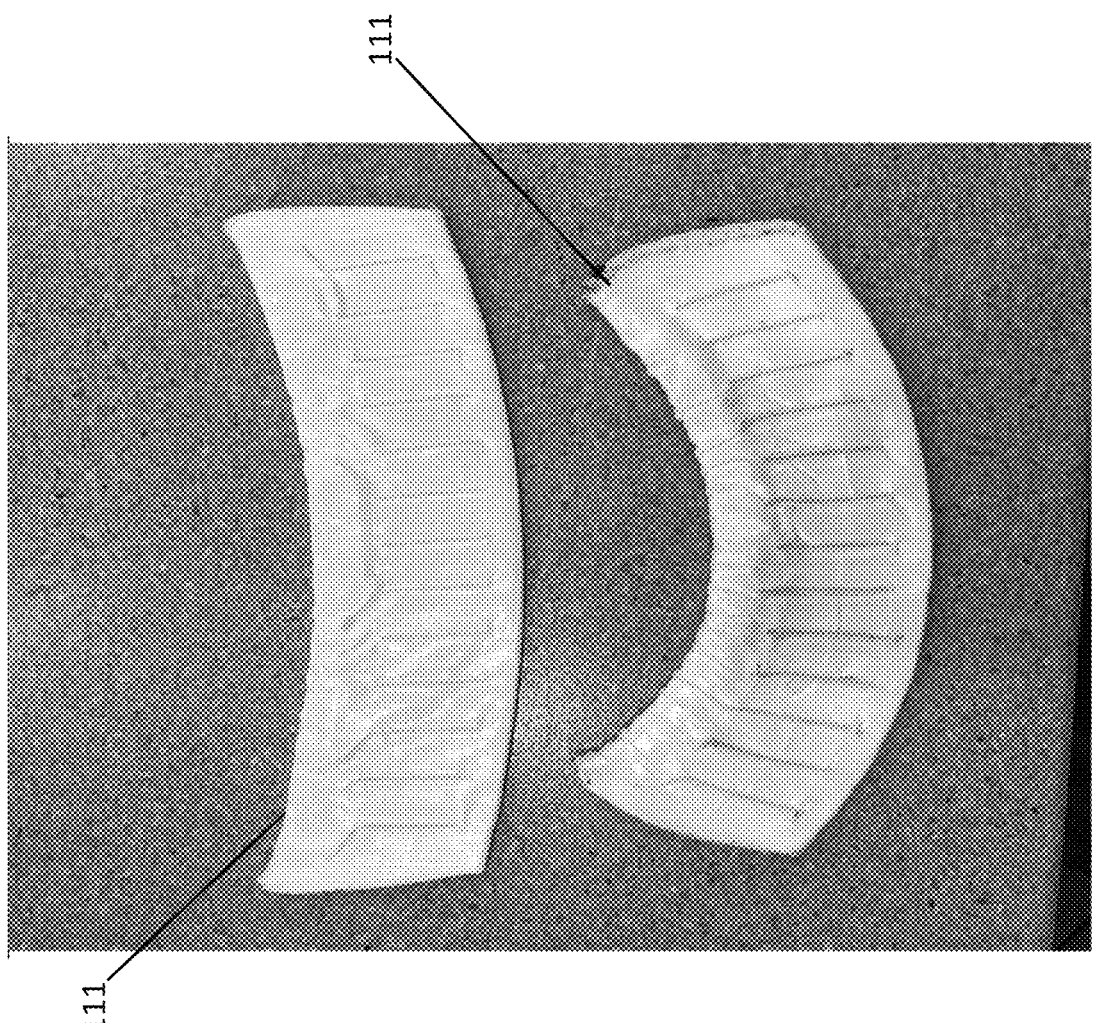
FIG. 7 illustrates a ballistic armor article having formed neckline in accordance with various embodiments.

Form Fitting for Matching the Edge to be Enhanced:

As shown in FIG. 7, in some embodiments, the first end 111 of the SDAP 101 can be formed or molded to match a shape of the edge to be enhanced 501.

Figure 8:
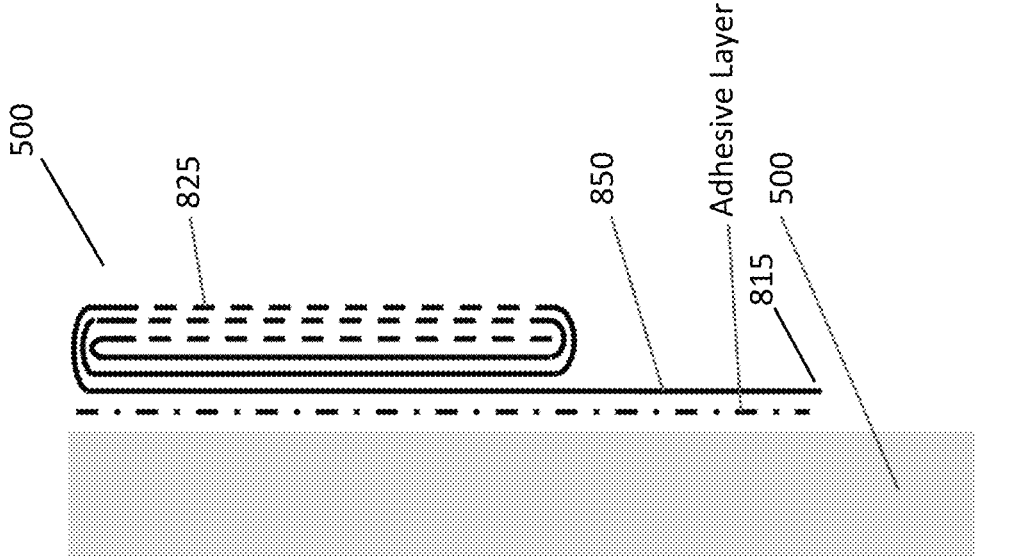
FIG. 8 illustrates a side view of a ballistic armor article installed along a neckline of an armor element and com- prising a roll-folded sheet of ballistic material wherein a portion of the sheet of ballistic material extends beyond the roll-folded portion.

Improving the Attachment of the SDAP to the Base Armor:

As shown in FIG. 8, in some embodiments, an SDAP 800 can generally be similar to the SDAP 100 described above except that a ballistic material sheet 801 thereof includes an extension section 850 extending between a roll-folded portion 825 and a free end 815 of the sheet 801. Such a configuration advantageously provides additional ballistic protection for the wearer and provides additional contact surface area for adhering the SDAP 800 to the body armor 500, which increases the ability of the SDAP 800 to withstand upward force from a threat projectile without separating from the body armor 500. In some embodiments (see FIGS. 9A-9B and 10A-10J) the extension section 850 can be modified to form a plurality of contour tabs to permit conforming of the SDAP 800 to surface and edge contours of the body armor 500.

Figure 9A:
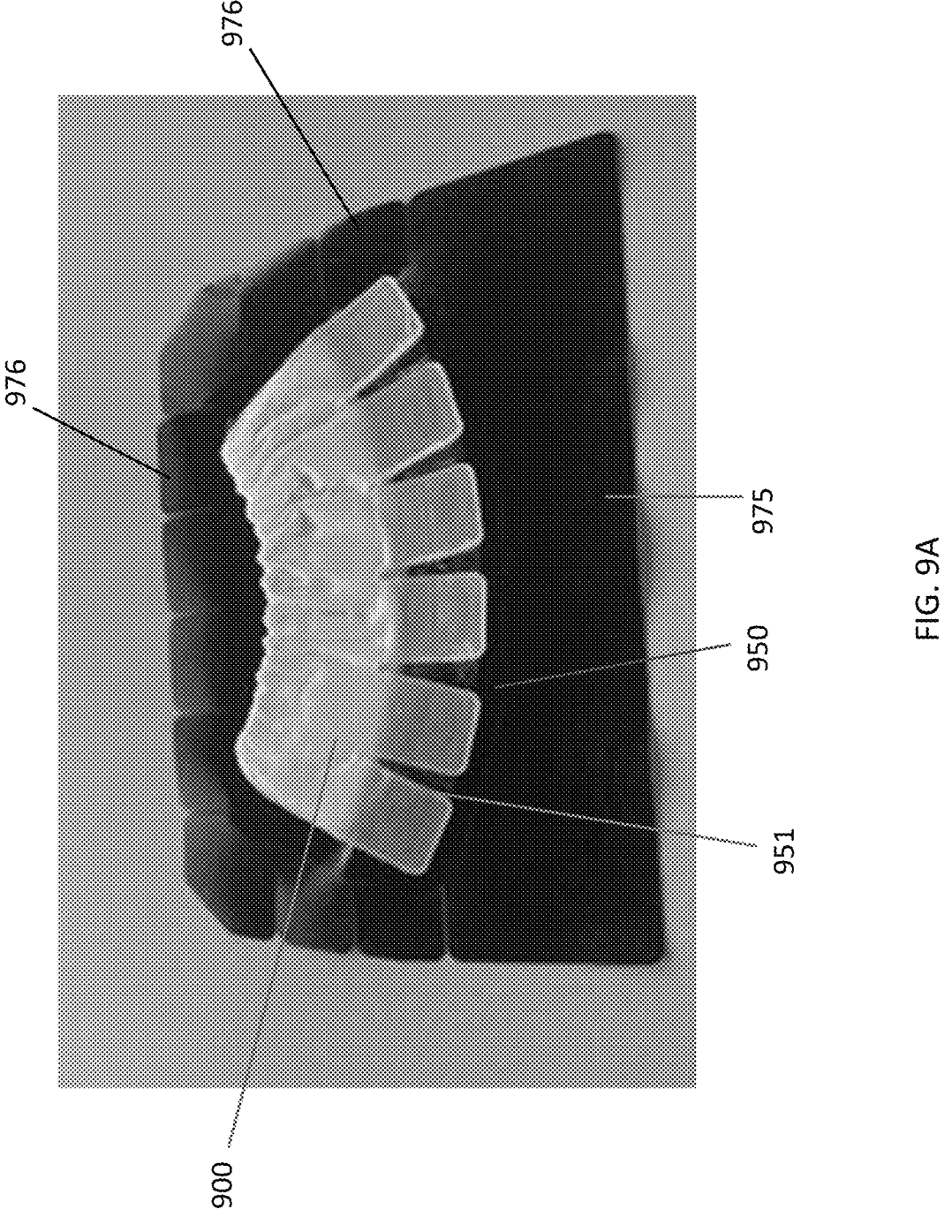
FIG. 9A is a rear view of a ballistic armor article com- prising a roll-folded sheet of ballistic material, wherein a portion of the sheet of ballistic material extending beyond the roll-folded portion includes a plurality of contouring tabs and is covered on a front side thereof by a ballistically fragile cover.
Figure 9B:
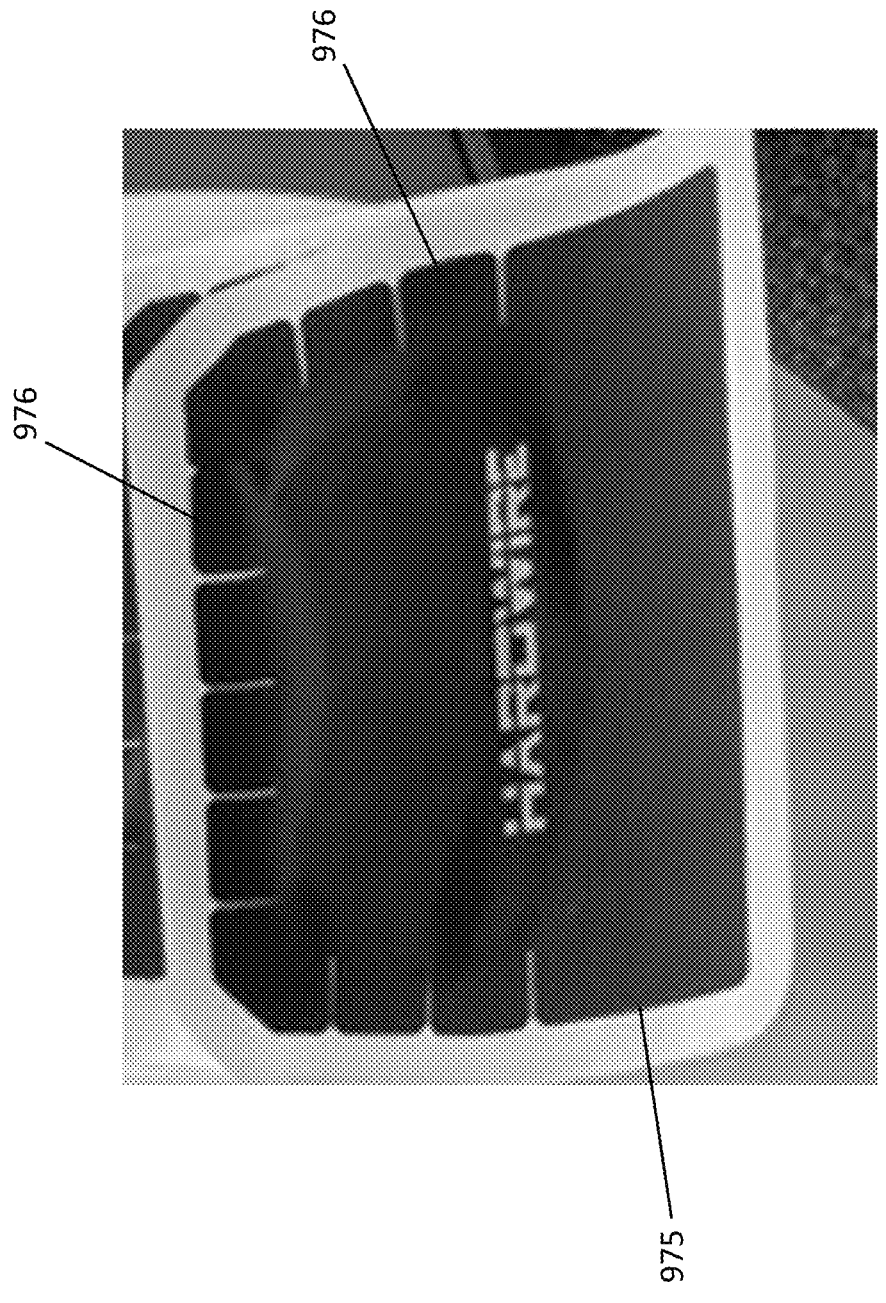
FIG. 9B is a front view of the ballistic armor article of FIG. 9A.

In some embodiments, as best shown in FIGS. 9A-9B, the SDAP 900 can be provided on an outward side (opposite the body armor to which the SDAP 900 is attached when installed) with a ballistically fragile cover 975. The cover can, in some embodiments, be in the form of an overlapping patch and can be constructed of any suitable, ballistically fragile material (e.g. nylon, polyester, cotton, or any other suitable fabric) and can be secured to the SDAP 900 by an adhesive (e.g., glue, hot melt, and/or pressure sensitive adhesive), stitched, or both. In some embodiments, an extension section 950 of the SDAP 900 can be modified to form a plurality of contour tabs 951 to permit conforming of the SDAP 900 to surface and edge contours of the body armor on which it is installed. Furthermore, as shown, in some embodiments, the ballistically fragile cover 975 is sized to extend over and beyond a perimeter of the SDAP 900. In such embodiments, the portions of the ballistically fragile cover 975 extending beyond the perimeter can be configured to be adhered by an adhesive, stitched, or both to the body armor to provide additional attachment surface, thereby reducing a risk of separation of the SDAP 900 from the attached body armor when withstanding upward force from a threat projectile. In addition, the portions of the cover 975 extending beyond the SDAP 900 can be formed into a plurality of cover tabs 976 to permit contouring of the cover 975 to better conform to the surface and edge contours of the body armor on which it is installed.

Installation Process

As shown in FIGS. 1A-10J, the SDAP 900 with cover 975 can be installed on a body armor insert 500 according to the following steps. First, as shown in FIG. 10A, a clean body armor insert can be laid strike face down so that the wear face (adjacent to the wearer in use) is up. Measure the distance from edge of panel to edge of panel at the neckline position and the neck centerline measured and marked. This mark is used to align the SDAP to the soft armor insert.

Figure 10A:
FIGS. 10A-10J illustrate steps for installing the ballistic armor article of FIG. 9A on a neckline of an armor element to form an edge enhanced armor.
Figure 10B:
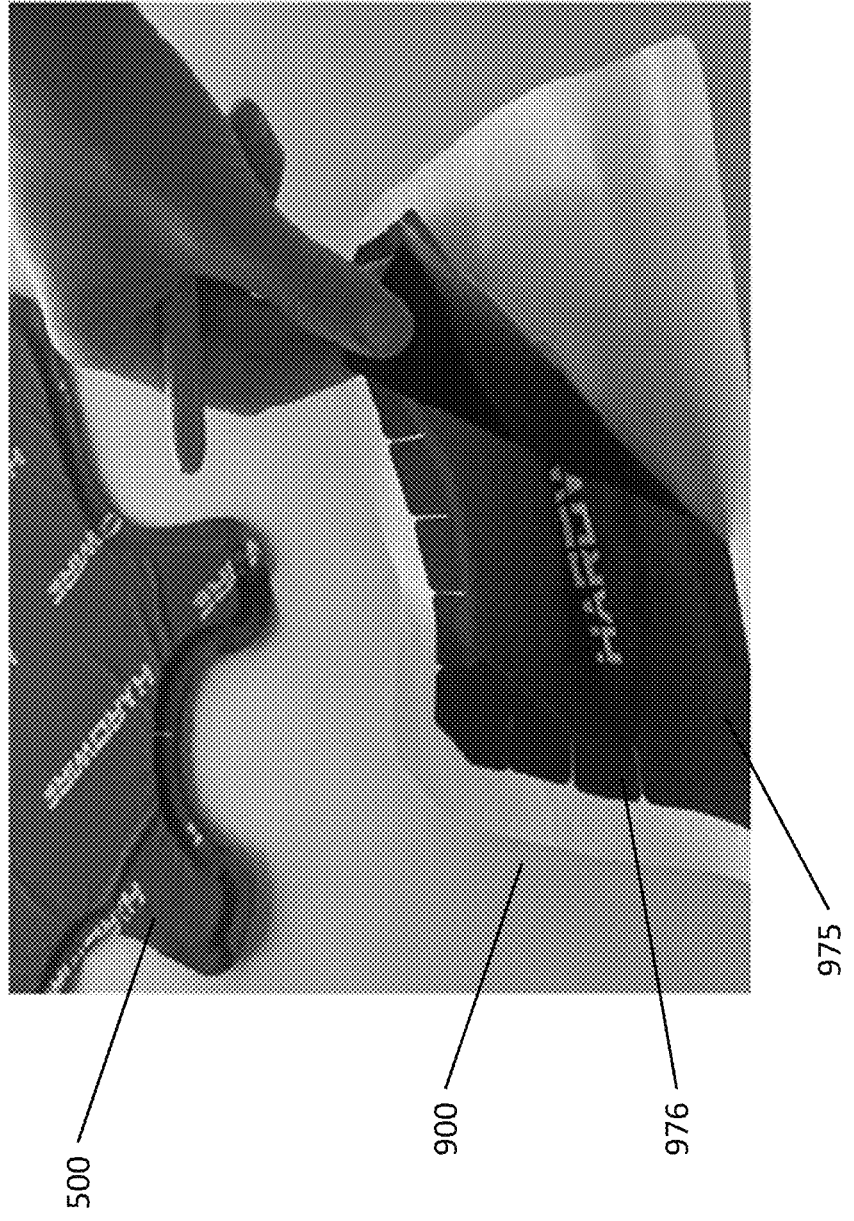
Figure 10C:
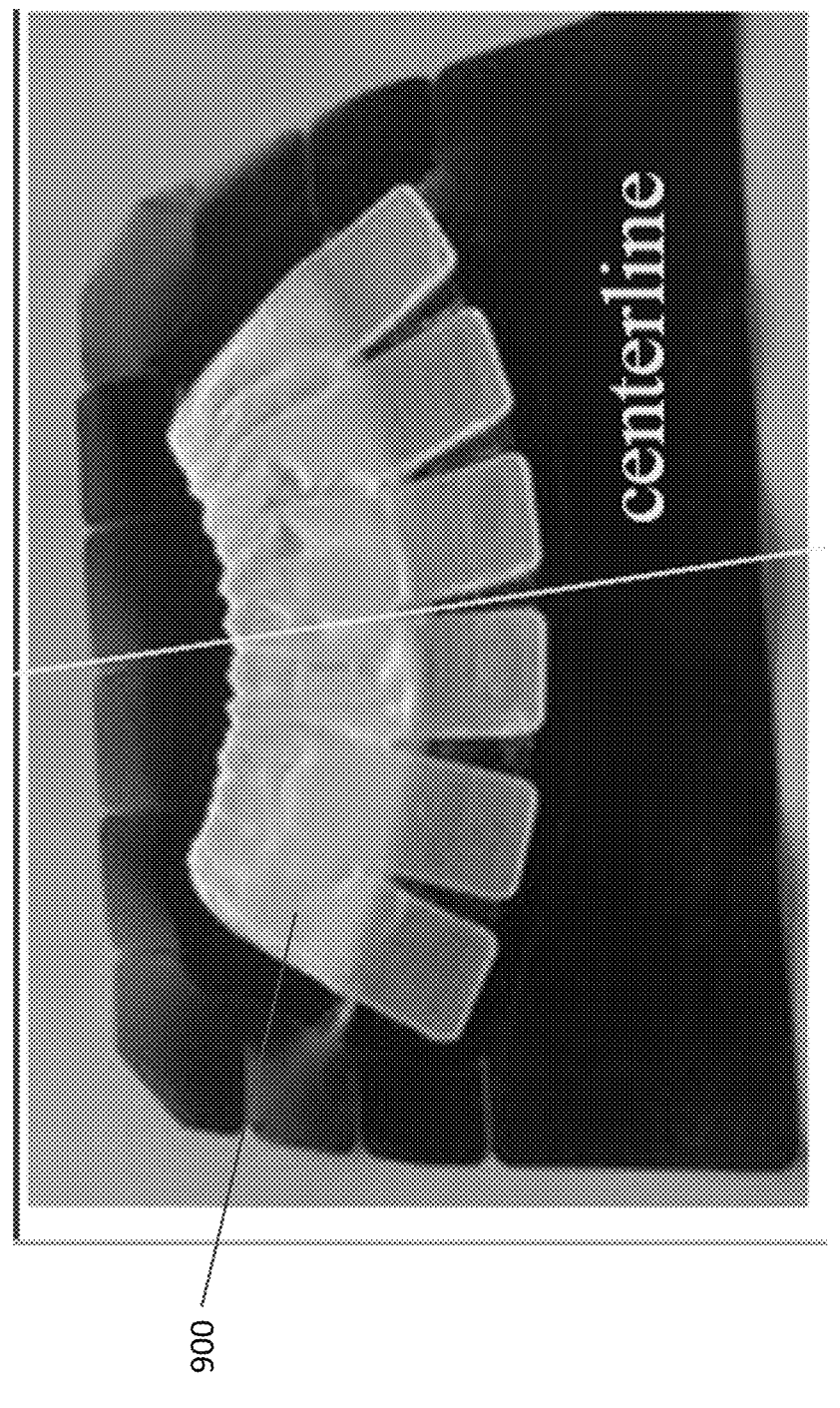
Figure 10D:
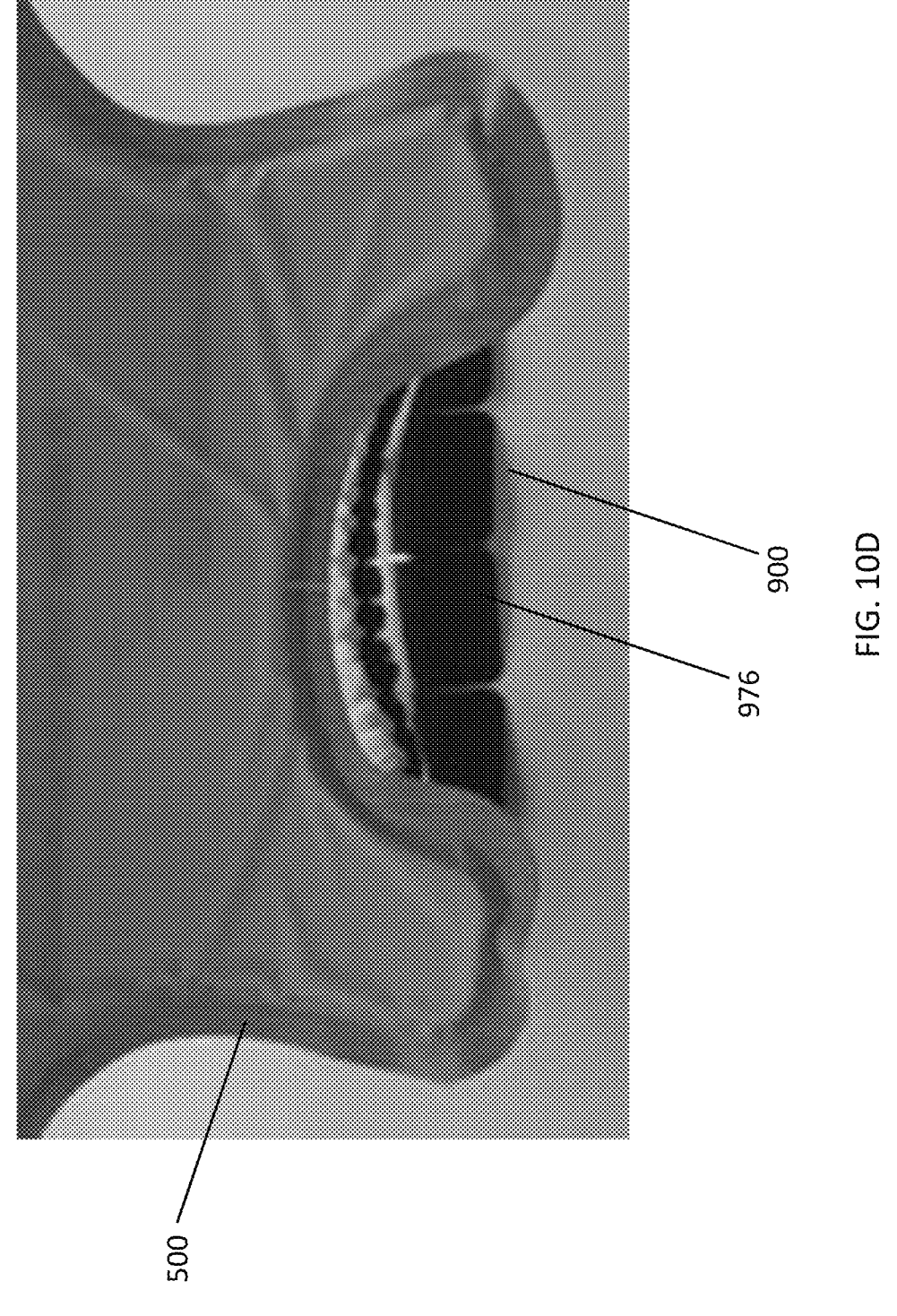
Figure 10E:
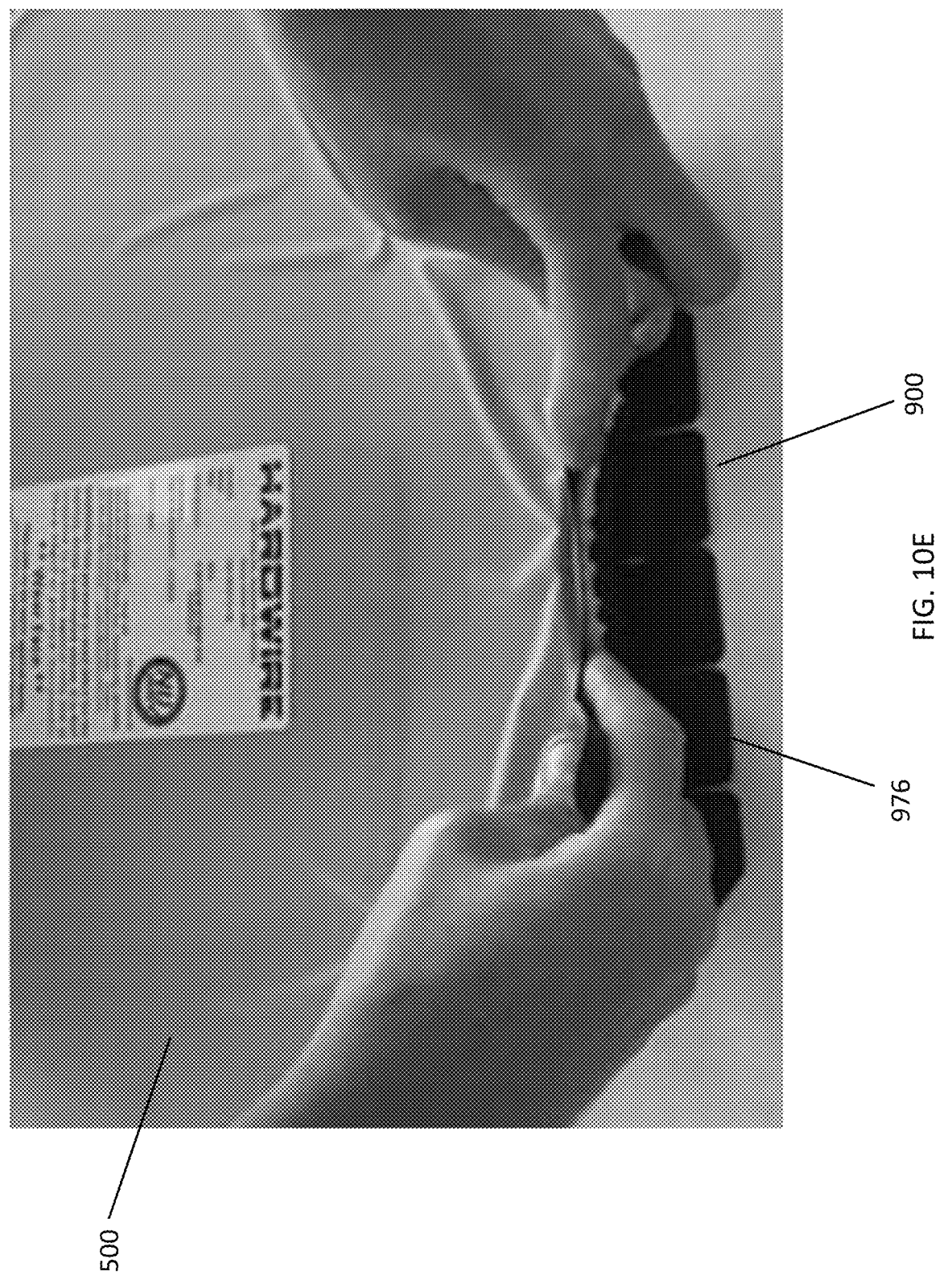
Figure 10G:
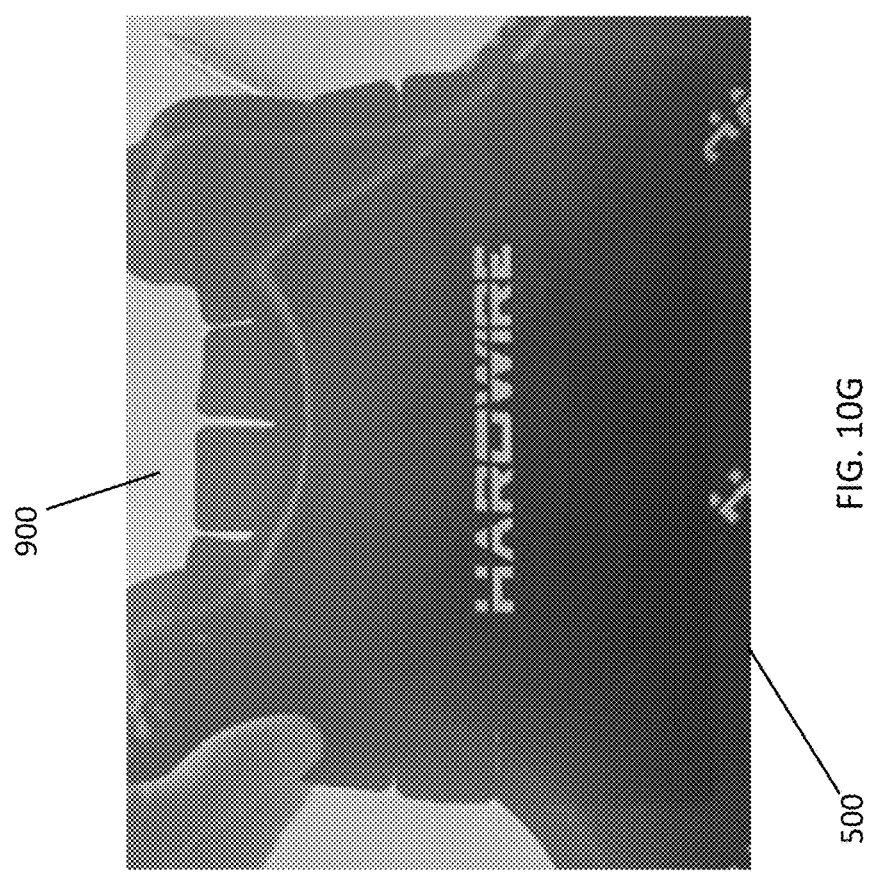
Figure 10F:
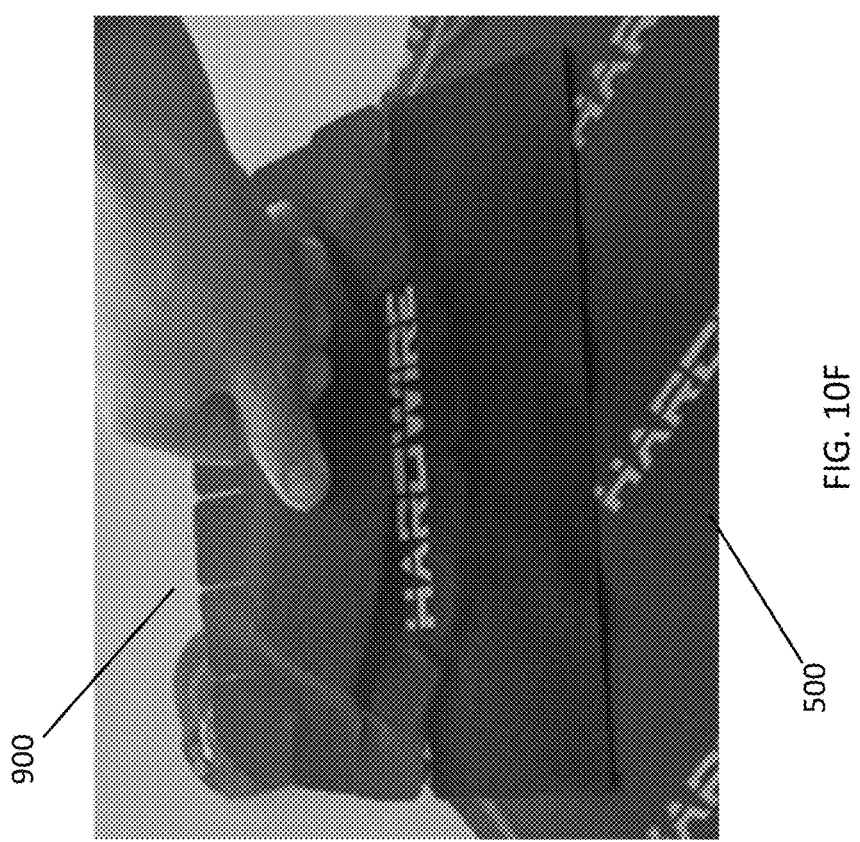
Figure 10I:
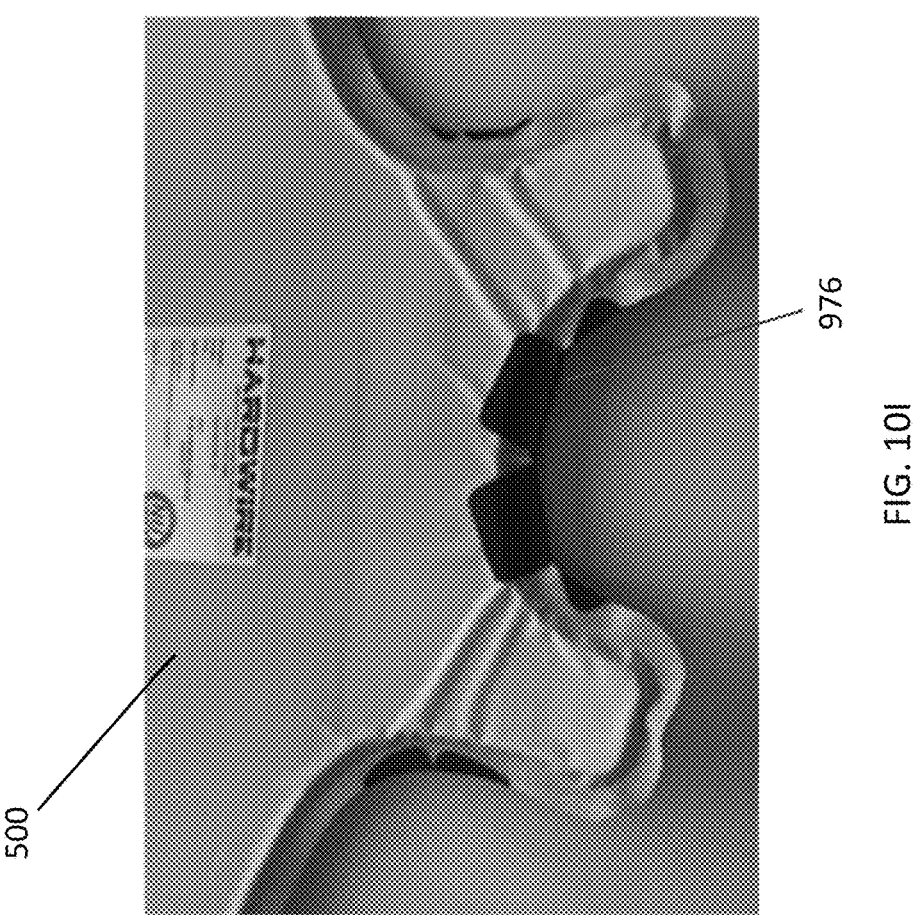
Figure 10H:
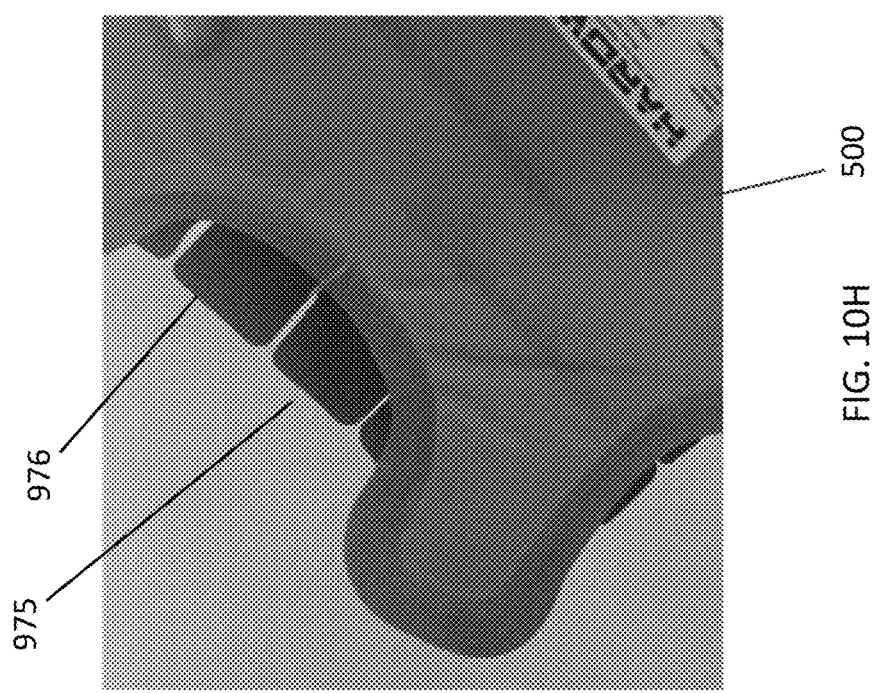
Figure 10J:

As shown in FIG. 10B, the SDAP 900 can be prepared by removing a paper backing to expose an adhesive on the cover 975 and the SDAP 900. Then, As shown in FIG. 10C, a centerline of the SDAP 900 is found and marked. Then, as shown in FIGS. 10D-10E, the SDAP 900 is aligned and initial adhesive contact made with the neckline of the body armor insert. Then, as shown in FIGS. 10F-10G the body armor insert is flipped over and pressure is applied all over the SDAP 900 to firmly adhere the SDAP 900 to the body armor insert. Finally, as shown in FIGS. 10H-10I, contour tabs 976 of the cover 975 are folded over the neckline of the body armor insert to form an edge enhanced body armor insert 1000 as shown in FIG. 10J.

While example embodiments have been particularly shown and described, it will be understood by those skilled in the art that various changes in form and details may be made therein without departing from the scope of the embodiments encompassed or contemplated herein.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

What is claimed is:

1. A ballistic armor article comprising:
   a first layer of ballistic material configured to permit a projectile to pass therethrough;
   a second layer of ballistic material for inhibiting the projectile from passing therethrough; and
   a connecting portion of ballistic material for preventing the projectile from passing therethrough, the connecting portion extending between the first and second layers;
   wherein, the connecting portion is positioned to inhibit the projectile from exiting the ballistic armor article due to ricocheting or spinning caused by impact between the projectile and the second layer.

2. The ballistic armor article of claim 1, wherein the first layer includes one or more apertures formed therein.

3. The ballistic armor article of claim 2, wherein the apertures are slits sized to permit entry of one or more projectiles into the ballistic armor article.

4. The ballistic armor article of claim 3 wherein the slits are about 2 inches long and spaced about 0.5 inches apart.

5. The ballistic armor article of claim 1, wherein the first layer and the second layer are formed in segments along a single continuous sheet of ballistic material, the first and second layers alternating longitudinally along the single sheet of ballistic material.

6. The ballistic armor article of claim 5, wherein the single continuous sheet of ballistic material is roll-folded to form the first and second layers such that the second layer is positioned closer to a wearer of the ballistic armor article than the first layer.

7. The ballistic armor article of claim 6, wherein the connecting portion includes a fold line in the single continuous sheet of ballistic material between the first layer and the second layer.

8. The ballistic armor article of claim 5, further comprising a plurality of first layers and a plurality of second layers formed in segments along the single continuous sheet of ballistic material, the first and second layers alternating longitudinally along the single continuous sheet of ballistic material.

9. The ballistic armor article of claim 8, wherein the single sheet of ballistic material is roll-folded to form the first and second layers such that at least one of the second layers is positioned closer to a wearer of the ballistic armor article than at least one of the first layers.

10. The ballistic armor article of claim 9, wherein each of the second layers is positioned closer to the wearer of the ballistic armor article than any of the first layers.

11. The ballistic armor article of claim 10, wherein each of the first layers includes one or more apertures formed therein and sized to permit entry of one or more projectiles into the ballistic armor article.

12. The ballistic armor article of claim 11, wherein the apertures formed in each of the first layers are offset such that the apertures in adjacent first layers are misaligned.

13. The ballistic armor article of claim 1 wherein the ballistic material includes at least one of ultra-high molecular weight polyethylene fibers in a urethane matrix, aramid fibers, polybenzoxazole, fiberglass, steel, or combinations thereof.

14. The ballistic armor article of claim 1, wherein the ballistic armor article is configured for attachment along an edge of a body armor element.

15. The ballistic armor article of claim 14, wherein the ballistic armor article is one or more of adhered by an adhesive, stitched, or both to the body armor element.

16. The ballistic armor article of claim 15, further comprising a ballistically fragile cover adhered to the ballistic armor article opposite the body armor element, wherein the ballistically fragile cover is sized to extend over the ballistic armor article and beyond a perimeter of the ballistic armor article, wherein portions of the ballistically fragile cover extending beyond the perimeter are configured to be adhered by an adhesive, stitched, or both to the body armor element to reduce a risk of separation of the ballistic armor article from the body armor element during a ballistic event.

17. The ballistic armor article of claim 14, wherein the body armor element is an armor vest or jacket and the edge is a neckline of the armor vest or jacket.

18. A ballistic armor device comprising an armor vest or jacket having the ballistic armor article of claim 1 integrally formed along a neckline thereof.

19. The ballistic armor article of claim 1, wherein the projectile is a bullet.

* * * * *